(12) United States Patent
Tomon

(10) Patent No.: US 6,727,862 B2
(45) Date of Patent: Apr. 27, 2004

(54) NON-CONTACT INFORMATION COMMUNICATION APPARATUS

(75) Inventor: Isao Tomon, Chiba (JP)

(73) Assignee: Japan Information System Co., Ltd., Tokyo-To (JP)

(*) Notice: Subject to any disclaimer, the term of this patent is extended or adjusted under 35 U.S.C. 154(b) by 0 days.

(21) Appl. No.: 10/199,111

(22) Filed: Jul. 22, 2002

(65) Prior Publication Data

US 2003/0184495 A1 Oct. 2, 2003

(30) Foreign Application Priority Data

Apr. 1, 2002 (JP) .................................. 2002-099074

(51) Int. Cl.[7] .............................. H01Q 1/36; H04Q 7/00
(52) U.S. Cl. ............. 343/895; 340/825.54; 343/700 MS
(58) Field of Search .......................... 343/895, 700 MS, 343/702, 841; 463/43, 44, 40, 41, 42; 340/572.5, 825.54; 235/380, 381

(56) References Cited

U.S. PATENT DOCUMENTS 6,018,298 A * 1/2000 Endo et al. .............. 340/572.5
6,234,902 B1 * 5/2001 Hazama ....................... 463/43

* cited by examiner

Primary Examiner—James Clinger
(74) Attorney, Agent, or Firm—Birch, Stewart, Kolasch & Birch, LLP

(57) ABSTRACT

A non-contact information communication apparatus according to the present invention has a bare IC and a sheet capacitor 3 implemented on substrate 1, and an antenna coil of vortical circle shape formed on the substrate 1 so as to enclose at least portion of the bare IC and the sheet capacitor 3. Because the number of turns of the antenna coil 4 is set to 7–10, the outer size of the antenna coil can be set to be equal to or smaller than one yen size. Each of the substrate 1, the antenna coil 4, the bare IC and the sheet capacitor 3 is thinned, and the thickness of the entire apparatus is set to be equal to or thinner than 100 μm. Because of this, the apparatus can be much thinner than the conventional apparatus, thereby using it in various field.

14 Claims, 3 Drawing Sheets

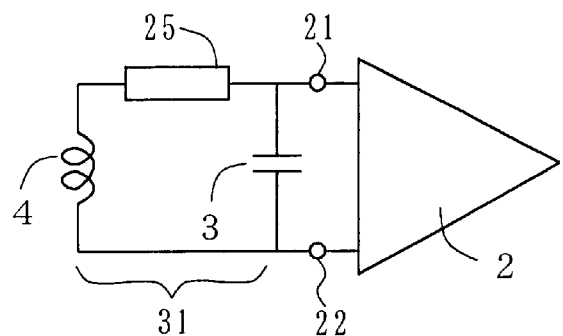
F I G. 5
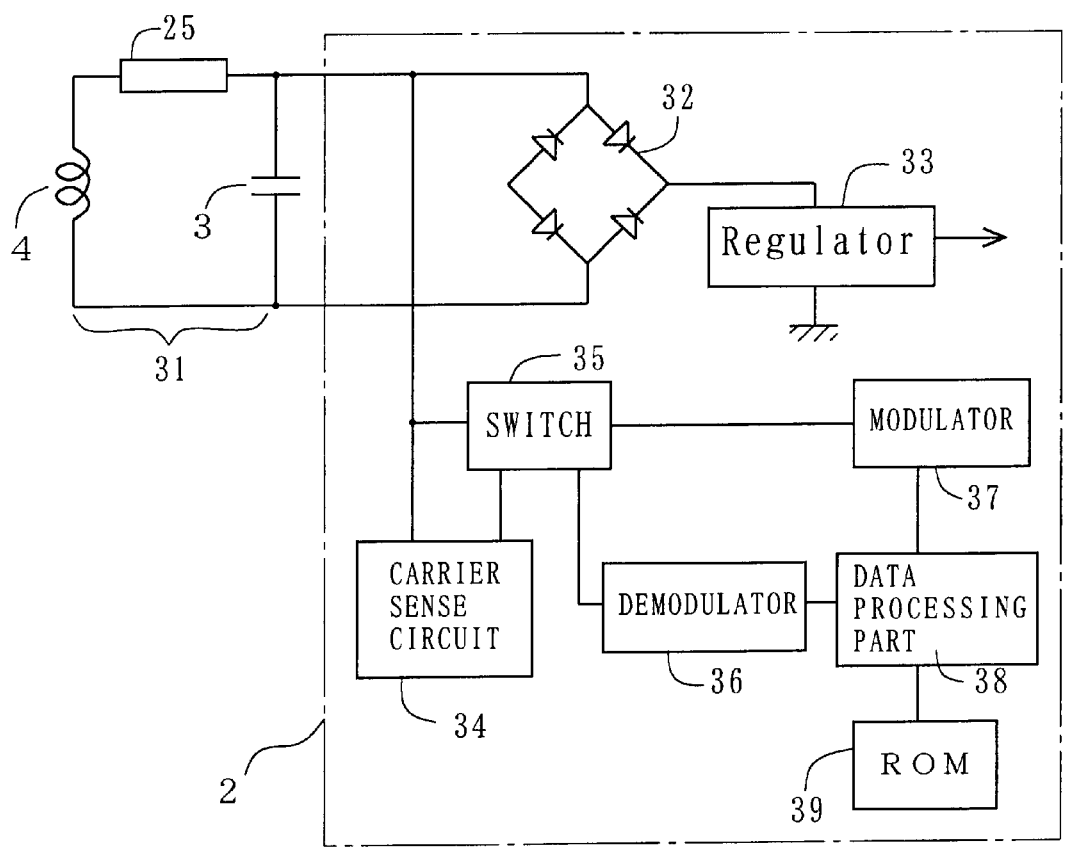
F I G. 6

NON-CONTACT INFORMATION COMMUNICATION APPARATUS

CROSS REFERENCE TO RELATED APPLICATIONS

This application is based upon and claims the benefit of priority from the prior Japanese Patent Applications No. 2002-99074, filed on Apr. 1, 2002, the entire contents of which are incorporated herein by reference.

BACKGROUND OF THE INVENTION

1. Field of the Invention

The present invention relates to a non-contact information communication apparatus capable of transmitting and receiving information at non-contact, which transmits and receives information by using power by electromagnetic induction.

2. Related Background Art

A non-contact type IC card becomes widely used. Such an IC card can transmit and receive information by air without being inserted to a card reader and so on. Because of this, it is easy-to-use for user, as compared with the conventional contact type IC card.

The antenna size of the conventional non-contact type IC card is a card size or a half card size, in order to enlarge receiving effective area of electromagnetic wave and assure communication distance. For example, non-contact type antenna for the IC card of 15×5 mm size has been realized.

In such a conventional non-contact type IC card, the number of turns of the loop antenna having large antenna aperture area is about 4–6, and the communication distance is about 30–35 mm. The reason is because the antenna is minute loop, and the antenna design is not optimized.

Furthermore, the thickness of the conventional non-contact type IC card is about 275 μm, and the weight is also heavy. Because of this, it is inconvenient to carry it. Moreover, because the antenna size is large, it is difficult to downsize the IC card, and to fabricate the IC card with very smaller size than the card size.

Furthermore, because the fabrication cost is more expensive than the conventional commuter pass or pre-paid card, it is practically necessary to toll a prescribed fare at the beginning of use.

SUMMARY OF THE INVENTION

An object of the present invention is to provide a non-contact information communication apparatus having a long communication distance, capable of realizing lightweight, thinness, downsizing, and low fabrication cost.

In order to achieve the foregoing object, a non-contact information communication apparatus, comprising:
 a resonance circuit which has an antenna coil and a capacitor connected between both ends of the antenna coil; and
 an IC which embeds a rectification circuit configured to rectify resonance output of said rectification circuit, a communication circuit configured to perform demodulation processing of the received radio signal and modulation processing of a transmission signal, and a storing part configured to store data included in the radio signal,
  wherein said resonance circuit and said IC are formed or implemented on a substrate;
  said IC operates by using a voltage rectified by said rectification circuit as a driving power supply;
  said antenna coil is formed of vortical pattern with the number of turns n (n is an integer equal to or more than 2) enclosing at least portion of said capacitor and said IC on the substrate; and
  said non-contact information communication apparatus has a size equal to or smaller than that of one yen, and a thickness equal to or thinner than that of one yen.

According to the present invention, because the antenna coil with vortical pattern is formed so as to enclose at least portions of the capacitor and the IC on the substrate, it is possible to downsize size of the entire apparatus. Furthermore, it is possible to reduce the thickness of the apparatus, as compared with the conventional apparatus.

BRIEF DESCRIPTION OF THE DRAWINGS

FIG. 5 is a block diagram showing internal configuration of the non-contact information communication apparatus of the present embodiment.

FIG. 6 is a block diagram for more specifically explaining the block diagram of FIG. 5.

DESCRIPTION OF THE PREFERRED EMBODIMENTS

Hereinafter, a non-contact information communication apparatus according to the present invention will be more specifically described with reference to drawings.

Figure 1:
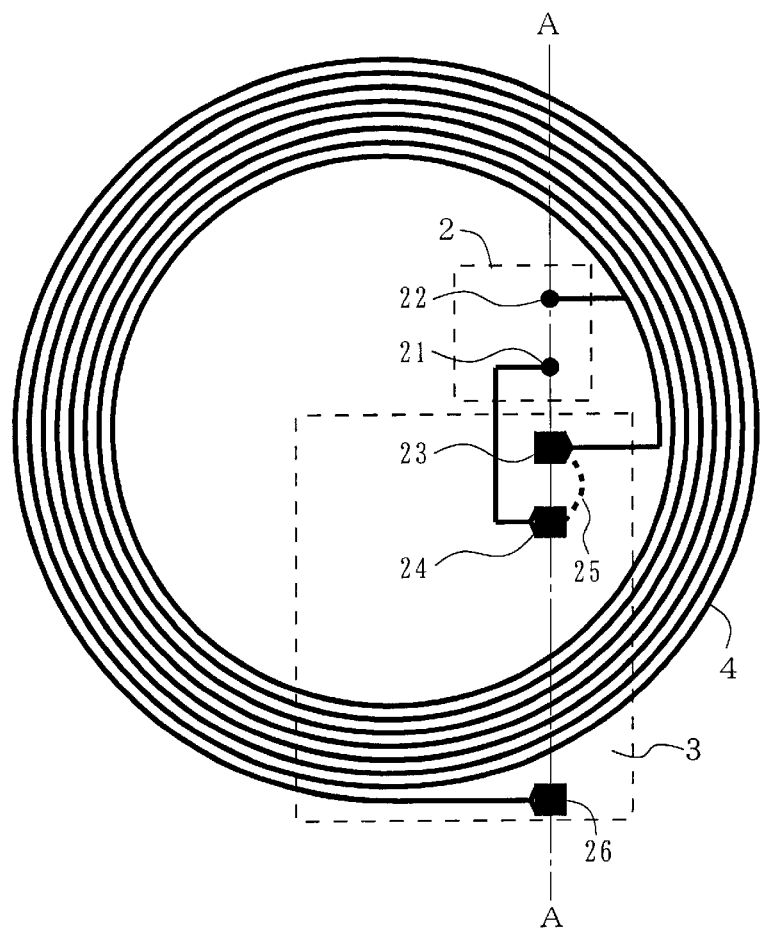
FIG. 1 is a layout view of an embodiment of the non-contact information communication apparatus according to the present invention.
Figure 2:
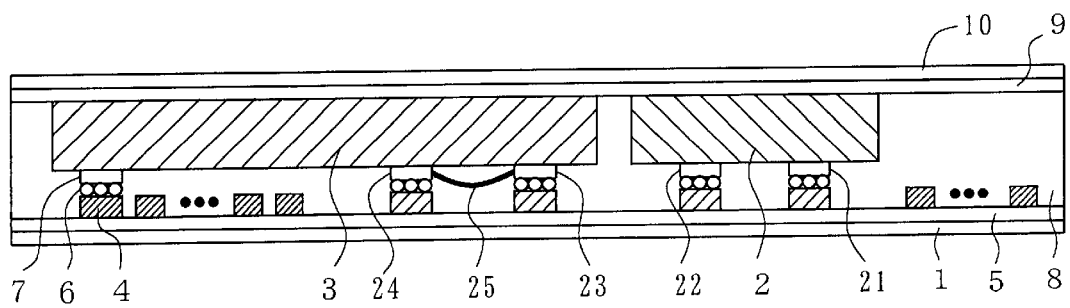
FIG. 2 is a cross sectional view of A—A line of FIG. 1.

FIG. 1 is a layout view of an embodiment of the non-contact information communication apparatus according to the present invention, and FIG. 2 is a cross sectional view of A—A line of FIG. 1.

The non-contact information communication apparatus of the present embodiment has a bare IC 2 and a sheet capacitor 3 implemented on the substrate 1, and an antenna coil 4 formed on the substrate 1 so as to enclose at least portions of the bare IC 2 and the sheet capacitor 3. The apparatus can be used as a tag adhered to commercial products and so on. The apparatus of FIG. 1 has the same size as that of one yen coin, and the thickness thereof is equal to or thinner than that of one yen coin.

The substrate 1 is formed of materials having low permittivity, such as polyimide, PET (polyethylene terephthalate), PEN and liquid crystal polymer (LCP). The thickness of the substrate 1 is about 20 μm.

As shown if FIG. 2, the antenna coil 4 is adhered with adhesive on the substrate 1. The material of the antenna coil 4 is a copper. FIG. 1 shows an example of antenna coil having a votical circle shape, in which the number of turns is 8. When the frequency of the radio signal is 13.56 MHz, it is desirable that the length of the antenna coil 4 is equal to or shorter than 360 mm, the number of turns is 7–10, and the thickness is 10–35 μm.

Figure 3:
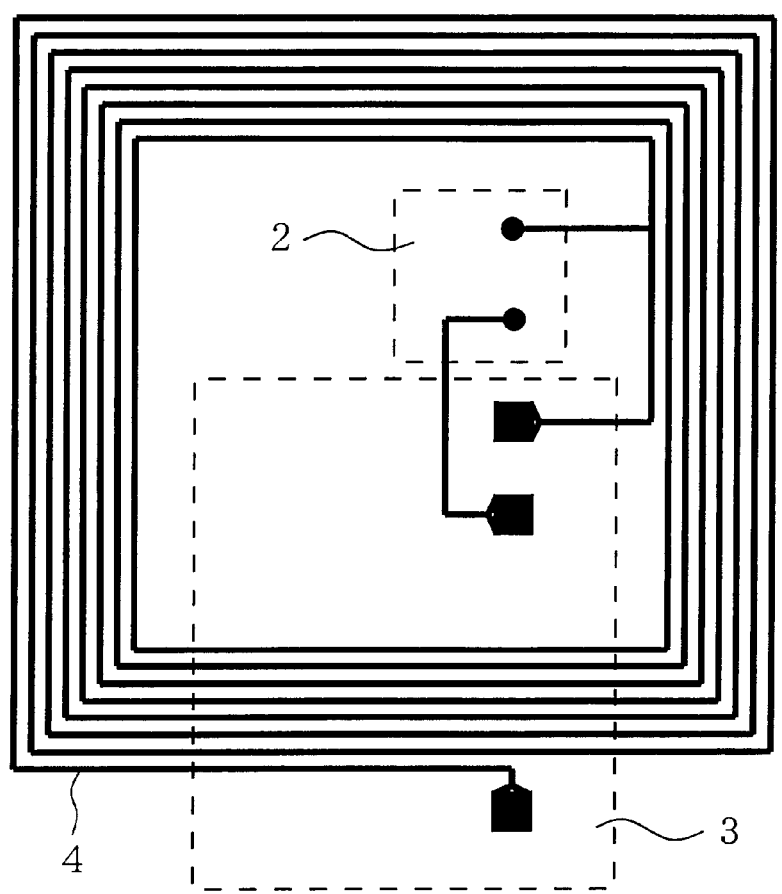
FIG. 3 is a layout view showing an example of the non-contact information communication apparatus using the antenna coil of vortical rectangle shape.

It is unnecessary that the shape of the antenna coil 4 is a vortical circle shape, as shown in FIG. 2. For example, the shape may be a vortical rectangle shape, as shown in FIG. 3.

The sheet capacitor 3 and the bare IC 2 are connected via an aeolotropic conductive film (ACP.) 6 and a bump. The sheet capacitor 3 and the bare IC 2 may be connected without the bump. In this case, if assumed that for example, the liquid crystal polymer (LCP) is used as the substrate, the thickness of the substrate 1 is 10 μm, the thickness of the antenna coil 4 is 10 μm, the thicknesses of the sheet capacitor 3 and the bare IC 2 are 50 μm, the thickness of the adhesive is 10 μm, and the thickness of the entire apparatus is 95 μm.

The sheet capacitor 3 has a dielectric film formed of polyimide, PET or mica, and an electrode formed of copper or aluminum on both faces of the dielectric film. The thickness of the sheet capacitor 3 is equal to or thinner than 40 μm, and the capacitance is about 100 pF.

Figure 4:
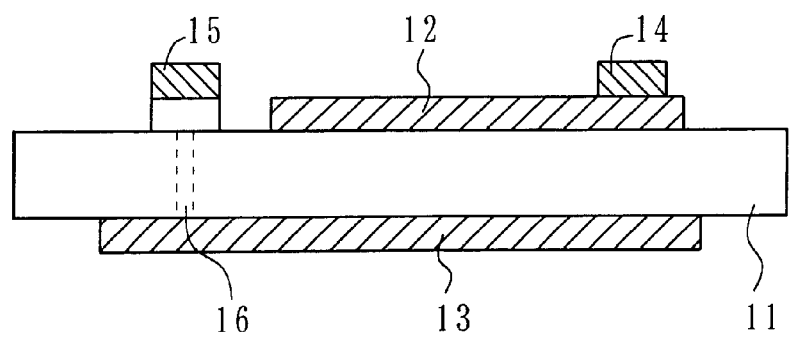
FIG. 4 is an enlarged view of cross sectional structure of the sheet capacitor 3.

FIG. 4 is an enlarged view of cross sectional structure of the sheet capacitor 3. As shown in FIG. 4, electrodes 12 and 13 each having the thickness of about 10 μm are formed on both faces of the dielectric 11 having the thickness of about 10 μm. Because the electrode pads 14 and 15 of the respective electrodes 12 and 13 are provided at the same face side, the electrode 13 at one side is conducted with the electrode pad 15 provided at the side of the other electrode 12. The thicknesses of the electrode pads 14 and 15 are about 5 μm.

The bare IC 2 is a thin film formed by polishing the semiconductor mechanically or chemically, and has the same thickness, i.e. about 40 μm, as that of the sheet capacitor 3. It is desirable to dispose the bare IC 2 and the sheet capacitor 3 as close as possible. The distance between the terminal of the bare IC 2 and the terminal of the sheet capacitor 3 is preferably within 15 mm.

As shown in FIG. 2, a hot metal material 8 is filled between the antenna coil 4, the sheet capacitor 3 and the bare IC 2. Adhesive 9 is coated with upper surfaces of the bare IC 2 and the sheet capacitor 3. A released paper 10 for protecting the adhesive is adhered on the adhesive. After the released paper 10 is released, the non-contact information communication apparatus of FIG. 1 can be adhered to arbitrary location, thereby being stably fixed to the location.

The adhesive 9 and the released paper 10 are not essential parts of the present invention. These are unnecessary if the non-contact information communication apparatus of the present embodiment is used without the adhesive.

FIG. 5 is a block diagram showing internal configuration of the non-contact information communication apparatus of the present embodiment. As shown in FIG. 5, the antenna coil 4 and the sheet capacitor 3 in a resonance circuit 31 are connected in parallel between first and second terminals 21 and 22 of the bare IC 2.

As shown in FIG. 1, a first terminal 23 of the antenna coil 4 and a first terminal 24 of the sheet capacitor 3 are electrically connected by a jumper cable, and the first terminal 24 of the sheet capacitor 3 and the first terminal 21 of the bare IC 2 are conducted by the pattern on the substrate 1. Similarly, the second terminal 22 of the bare IC 2 is conducted by the pattern on the substrate 1.

FIG. 6 is a block diagram for more specifically explaining the block diagram of FIG. 5. As shown in FIG. 6, the non-contact information communication apparatus according to the present embodiment has a rectification circuit 32 for rectifying resonance output of the resonance circuit 31, a regulator 33 for generating a DC voltage based on the rectification output of the rectification circuit 32, a carrier sense circuit 34 for detecting whether or not the electromagnetic wave is received, a switch 35 for switching transmission/reception, a demodulator 36 for demodulating the reception signal, a modulator 37 for modulating the transmission signal, a data processor 38 for generating the transmission signal and analyzing the reception signal, and a ROM 39 for storing at least portion of the transmission/reception signals. All the constituents of FIG. 6 except for the resonance circuit 31 is embedded in the bare IC 2.

The resonance frequency of the resonance circuit 31 is, for example, 13.56 MHz. When the electromagnetic wave is received, the resonance circuit 31 generates the magnetic field, the magnetic field is converted into the electric signal, and the rectification circuit 32 generates the DC voltage based on the electric signal. The DC voltage is a driving power supply of the entire bare IC 2. Therefore, it is possible to drive the bare IC 2 by the received power, and a battery becomes unnecessary.

The carrier sense circuit 34 detects whether or not the electromagnetic wave is received, base on the resonance output of the resonance circuit 31. If determined to have been received, the switch 35 is switched at reception side. Therefore, the reception signal is inputted to the demodulator 36 via the switch 35 to perform the demodulation processing. The data processor 38 extracts the necessary data from the output of the demodulator 36 to store the extracted data into the ROM 39.

On the other hand, when the electromagnetic wave is transmitted, the data processor 38 reads out the necessary data from the ROM 39 to generate the transmission data, modulates the signal by the modulator 37, and transmits the modulated signal to the resonance circuit 31 via the switch 35. Therefore, the transmission electromagnetic wave is emitted from the antenna coil 4.

In the configuration of FIG. 6, if the resonance circuit 31 corresponding to communication speed of data is not formed, data drops out. Because of this, an RF resistor affected by Q of the resonance circuit 31 is controlled by the number of turns of the antenna coil 4.

An effective height he of a loop antenna 1 is expressed by $he=2\pi nA/\lambda$, where n is the number of turns, A is loop area, and $\lambda$ is wave length.

When the effective height he is constant, as the loop area is large, the number of turns n becomes small. Conversely, as the loop area A is small, the number of turns n becomes large. In the present embodiment, in order to downsize the entire apparatus, the loop area A is minified, and the number of turns n is enlarged.

Furthermore, in the present embodiment, the communication speed is set to about 106 kbps, and in order to obtain the circuit Q corresponding to the communication speed, the RF resistor of the antenna coil 4 is controlled so that the communication data does not drop out.

As an example, in the case of the wave length $\lambda=22.12$ m, the loop area $A=0.02226$ and the number of turns $n=8$, the antenna effective height he is $he=5.15\times10^{-2}$ m. The capacitance of the sheet capacitor 3 is about 90 PF, the inductance of the antenna coil 4 is 1.53 μH, the RF resistance of the antenna coil 4 is about 1.18Ω. Because of this, the circuit Q is about 113, and it is possible to improve sensitivity and transmit/receive data without dropping out data.

Here, if assumed that the loop antenna of the loop area $A=100$ cm$^2$ and the number of turns $n=2$ is used for transmission, and the antenna output is 0.5W, the load resistance is 50Ω, and the antenna current is 0.1A, electric intensity in 2 m of maximum radiation direction will be calculated as follows.

The electric intensity E is expressed as $E=60\pi Ihe/(\lambda d)$, and the antenna effective height he is $he=5.15\times10^{-2}$.

Because of this, the electric intensity E of maximum radiation direction (angle 0°) is expressed by the following expression.

$$E(\text{angle } 0°)=60\ \pi \times 0.1 \times 5.15 \times 10^{-2}/(22.12 \times 2)=21.93\ \text{mV}.$$

That is, the electric intensity at this time is 86.83 db µV/m.

When the angular with regard to the maximum radiation direction is 30°, E=19.079 mV or 75.6 dbµV/m.

When the electric intensity is obtained, and efficiency of the rectification circuit 32 in the bare IC 2 and the driving current are measured, it is possible to decide the communication distance. When the antenna output is 4W, the antenna current is 0.28A, the electric intensity E of maximum radiation direction is E=61.4 mW or 95.76 dbµV/m, and the electric intensity E of angle 30° with regard to maximum radiation direction is E=83 dbµV/m. Thus, the communication distance largely changes by the design of the antenna.

As mentioned above, in the present embodiment, the antenna coil 4 of vortical circle shape is formed on the substrate 1, and the number of turns is set to 7–10. Because of this, outer size of the antenna can be set to be smaller than one yen size.

Furthermore, each of the substrate 1, the antenna coil 4, the bare IC and the sheet capacitor 3 is thinned, and the thickness of the entire apparatus is set to be equal to or smaller than 100 µm. Because of this, the entire apparatus becomes much thinner, as compared with the conventional apparatus, thereby using the apparatus for various fields.

Especially, as shown in FIG. 2, if the adhesive is coated with the bare IC and the sheet capacitor 3, the apparatus can be adhered to various places similarly to the seal, and becomes easy-to-use. Furthermore, because it is unnecessary to embed in the card such as the existing IC card, it is possible to reduce the fabrication cost.

More specifically, the apparatus according to the present embodiment can be used as a tag for managing commercial products, used for personal certification by attaching to a business card or the IC card, and used as a prepaid card or a credit card.

When using as the tag, information of the commercial products is recorded to the ROM 39 of FIG. 6. When using for personal certification, personal information such as full name and birthday of user is recorded to the ROM 39. When using as the prepaid card, the money account information is recorded to the ROM 39. When using as the credit card, the personal information and payment information is recorded to the ROM 39. Although memory capacity of the ROM 39 is not limited, the ROM 39 has preferably the memory capacity more than 1 kilobyte.

Besides this, the non-contact information communication apparatus of the present embodiment is available for various purposes such as identification of distribution of goods, management of entrance and exit, employee ID card, management of record information, livestock management, baby management, asset management, library management, and security management.

Shape of the non-contact information communication apparatus according to the present invention is not limited to one shown in FIGS. 1–4, and various variation is possible. For example, the jumper cable 25 may be formed by using a portion of the electrodes of the sheet capacitor 3. Therefore, it is possible to unify the jumper cable 25 and the electrode, thereby simplifying the structure.

Although size of the IC 2 is different from that of the sheet capacitor 3 in FIG. 1, both sizes may be substantially the same, thereby simplifying the structure.

What is claimed is:

1. A non-contact information communication apparatus, comprising:

a resonance circuit which has an antenna coil and a capacitor connected between both ends of the antenna coil; and an IC which embeds a rectification circuit configured to rectify a resonance output of said rectification circuit, a communication circuit configured to perform demodulation processing of the received radio signal and modulation processing of a transmission signal, and a storing part configured to store data included in the radio signal, wherein said resonance circuit and said IC are formed or implemented on a substrate;

said IC operates by using a voltage rectified by said rectification circuit as a driving power supply; and said antenna coil is formed of a pattern enclosing at least a portion of said capacitor and said IC on the substrate.

2. The non-contact information communication apparatus according to claim 1, wherein said antenna coil has a shape of a circle or a rectangle.

3. The non-contact information communication apparatus according to claim 1, wherein a thickness of said antenna coil is within 10–35 µm, and said antenna coil is formed of material including copper.

4. The non-contact information communication apparatus according to claim 1, wherein said antenna coil is formed of a vertical pattern with a number of turns n, where n is an integer greater than or equal to 2.

5. The non-contact information communication apparatus according to claim 1, wherein a line length of said antenna coil is within 360 mm.

6. The non-contact information communication apparatus according to claim 1, wherein a maximum outer size of said antenna coil is equal to or smaller than 18 mm.

7. The non-contact information communication apparatus according to claim 1, wherein the radio signal has a frequency signal of 13.56 MHz.

8. The non-contact information communication apparatus according to claim 1, wherein said capacitor is formed of at least one of polyimide, polyethylene terephthalate, PEN and liquid crystal polymer.

9. A non-contact information communication apparatus according to claim 1, comprising:

a resonance circuit which has an antenna coil and a capacitor connected between both ends of the antenna coil; and an IC which embeds a rectification circuit configured to rectify a resonance output of said rectification circuit, a communication circuit configured to perform demodulation processing of the received radio signal and modulation processing of a transmission signal, and a storing part configured to store data included in the radio signal, wherein said resonance circuit and said IC are formed or implemented on a substrate;

said IC operates by using a voltage rectified by said rectification circuit as a driving power supply;

said antenna coil is formed of a pattern enclosing at least a portion of said capacitor and said IC on the substrate; and said capacitor has three terminals which are arranged on substantially one line with one or more terminals of said IC.

10. A non-contact information communication apparatus comprising:
- a resonance circuit which has an antenna coil and a capacitor connected between both ends of the antenna coil; and
- an IC which embeds a rectification circuit configured to rectify a resonance output of said rectification circuit, a communication circuit configured to perform demodulation processing of the received radio signal and modulation processing of a transmission signal, and a storing part configured to store data included in the radio signal,
- wherein said resonance circuit and said IC are formed or implemented on a substrate;
- said IC operates by using a voltage rectified by said rectification circuit as a driving power supply;
- said antenna coil is formed of a pattern enclosing at least a portion of said capacitor and said IC on the substrate;
- a first terminal of said antenna coil and a first terminal of said capacitor are electrically conducted to each other by a jumper cable;
- the first terminal of said capacitor and the first terminal of said IC are conducted to each other by a pattern on the substrate; and
- a second terminal of said IC and said antenna coil are conducted to each other by a pattern on the substrate.

11. The non-contact information communication apparatus according to claim 10, wherein said jumper cable is formed by using a portion of the electrode of said capacitor.

12. The non-contact information communication apparatus according to claim 1, wherein a minimum distance between the terminal of said IC and the terminal of said capacitor is set to be within 15 mm.

13. The non-contact information communication apparatus according to claim 1, wherein said capacitor and said IC have substantially the same shape and the same size.

14. The non-contact information communication apparatus according to claim 1, wherein an adhesive is coated with faces opposite to faces contacted on the substrate of said capacitor and said IC.

* * * * *